United States Patent
Kodama

[11] Patent Number: 5,222,397
[45] Date of Patent: Jun. 29, 1993

[54] PRESSURE SENSOR

[75] Inventor: Seiki Kodama, Himeji, Japan

[73] Assignee: Mitsubishi Denki Kabushiki Kaisha, Tokyo, Japan

[21] Appl. No.: 798,588

[22] Filed: Nov. 26, 1991

[30] Foreign Application Priority Data

Nov. 28, 1990 [JP] Japan .................. 2-322280
Nov. 28, 1990 [JP] Japan .................. 2-322281

[51] Int. Cl.$^5$ ............................................ G01L 9/06
[52] U.S. Cl. ...................................... 73/756; 73/706;
73/727; 338/4; 338/42
[58] Field of Search .................. 73/706, 708, 720, 721,
73/726, 727, 756, 115; 338/4, 42

[56] References Cited

U.S. PATENT DOCUMENTS

| 4,586,018 | 4/1986 | Bettman | 338/42 |
| 4,833,922 | 5/1989 | Frick et al. | 73/756 |
| 4,934,193 | 6/1990 | Hayata | 73/706 |

FOREIGN PATENT DOCUMENTS

| 1807875 | 6/1969 | Fed. Rep. of Germany. | |
| 0241476 | 12/1986 | Fed. Rep. of Germany | 73/720 |
| 4118824 | 12/1991 | Fed. Rep. of Germany. | |

OTHER PUBLICATIONS

U.S. Ser. No. 07/683,632, filed Apr. 11, 1991; assigned to GAU: 2611.
U.S. Ser. No. 07/710,987, filed Apr. 11, 1991; assigned to GAU: 2613.

Primary Examiner—Donald Woodiel
Attorney, Agent, or Firm—Sughrue, Mion, Zinn, Macpeak and Seas

[57] ABSTRACT

A pressure sensor comprising a pressure sensing assembly 24 and a pressrue transmitting medium 26 disposed within a main body 20 a seal assembly 34,35,36 disposed between the pressure sensing assembly and the main body for sealing between them against said pressure transmitting medium while allowing an easy attachment and detachment of the pressure sensing assembly relative to the main body. The pressure sensing assembly may comprise a sensing element 27 for detecting pressure, a base plate 25 for sealingly supporting the pressure sensing element within the main body and a pressure transmitting pipe 26 for transmitting the pressure to be detected to the element, and an O-ring in contact with the pressure transmitting pipe. A filling passage 15 which may be closed by a plug screw 16 may be disposed in the main body for filling the detection cavity with the pressure transmitting medium.

5 Claims, 2 Drawing Sheets

PRESSURE SENSOR

BACKGROUND OF THE INVENTION

This invention relates to a pressure sensor and, more particularly, to a pressure sensor for use in an automotive internal combustion engine in which a pressure transmitting liquid is filled between a pressure detection assembly and a flexible diaphragm.

FIG. 2 illustrates one example of a conventional pressure sensor for use in detecting gas pressure within a combustion chamber of an internal combustion engine. In FIG. 2, reference numeral 1 designates a stainless steel case to be attached to an engine (not shown), 2 designates a diaphragm attached to an inner or lower end of the case 1, 3 designates an electrically insulating base, 4 designates a mounting bed made of a ceramic material and welded to the case 1, and 5 designates a pressure sensing element bonded to the mounting bed 4. The pressure sensing element 5 illustrated is a silicon semiconductor strain gauge. A pressure transmitting liquid of silicone oil 10 having a high boiling point is filled between the pressure sensing element 5 and the flexible diaphragm 2.

Reference numeral 6 designates terminals attached to the base 3, 7 designates bonding wires connecting the terminals 6 to the pressure sensing element 5, 8 designates a plug thread-engaged with the case 1, and 9 designates output lines extending through the plug 8 and connected at one end to the terminals 6.

The pressure increase within the combustion chamber of an internal combustion engine causes the diaphragm 2 to flex upward in FIG. 2 and the pressure of the silicone oil 10 is increased, which in turn is sensed by the pressure sensing element 5. Then the pressure sensing element 5 generates an electrical signal indicative of the pressure change and supplies it through the bonding wires 7, the terminals 6 and the output lines 9 to an unillustrated external circuit for controlling the ignition timing of the ignition plug in accordance with the combustion conditions within the combustion chamber.

During assembly of the conventional pressure sensor as described above, the base 3 on which the terminals 6 are attached and the mounting bed 4 on which the pressure sensing element 5 is bonded are securely attached to the inner surfaces of the substantially cup-shaped case 1. Thereafter, the pressure sensing element 5 and the terminals 6 are wire-bonded within the cup-shaped casing 1 to electrically connect them by the bonding wires 7. Therefore, the wire-bonding operation must be carried out within the relatively narrow and hard-to-access space defined in the case 1, making the assembling efficiency relatively poor.

With the conventional pressure sensor, the test and calibration of the pressure sensing element can be carried out only after the above assembly including welding and wire-bonding operations has been completed. Therefore, sometimes the assembled pressure sensing element is found to be non-conforming only after the assembly, wasting time and materials used in assembly.

Also, the pressure transmitting liquid must be filled within the cavity formed in the main body when the mounting bed 4 with the pressure sensing element thereon or the flexible diaphragm is being attached to the main body. Also, since the mounting bed 4 supporting the pressure sensing element 5 is welded to the case 1, the welding heat applied during the assembly causes the mounting bed 4 to distort and deform, which results in an undesirable effect on the pressure sensing element 5 which may result in detection errors.

SUMMARY OF THE INVENTION

Accordingly, one object of the present invention is to provide a pressure sensor free from the above-discussed problems of the conventional pressure sensor.

Another object of the present invention is to provide a pressure sensor having an improved assembling efficiency.

Another object of the present invention is to provide a pressure sensor whose assembly can be easily tested.

Still another object of the present invention is to provide a pressure sensor in which the pressure transmitting medium can be easily filled.

With the above objects in view, the pressure sensor comprises a hollow main body defining a bore extending therethrough and having a detection end and an output end and a flexible diaphragm sealingly attached to the main body at the detection end for receiving a pressure to be detected. A pressure sensing assembly is disposed within the bore of the main body opposite to the diaphragm to define therebetween a closed detection cavity which is filled with a pressure transmitting medium such as silicone oil. The detection cavity is sealed by a seal such as an O-ring disposed between the pressure sensing assembly and the main body for sealing therebetween while allowing an easy attachment and detachment of the pressure sensing assembly relative to the main body.

The pressure sensing assembly may comprise a pressure sensing element for detecting pressure, a base plate for sealingly supporting the pressure sensing element within the main body and a substantially cylindrical pressure transmitting pipe attached to the base plate for transmitting the pressure to be detected, wherein the O-ring of the seal means is in contact with the pressure transmitting pipe.

The pressure sensor may further comprise a filling passage, which may be an internally threaded conduit in communication with the detection cavity, disposed in the main body for filling the detection cavity with the pressure transmitting medium therethrough, and a plug member, which may be a screw thread-engaged with the threaded passage, disposed in the filling passage for sealing the filling passage. The plug screw fitted in the filling passage may be sealed with a seal resin.

BRIEF DESCRIPTION OF THE DRAWINGS

The present invention will become more readily apparent from the following detailed description of the preferred embodiments of the present invention taken in conjunction with the accompanying drawings, in which.

DESCRIPTION OF THE PREFERRED EMBODIMENTS

Figure 1:
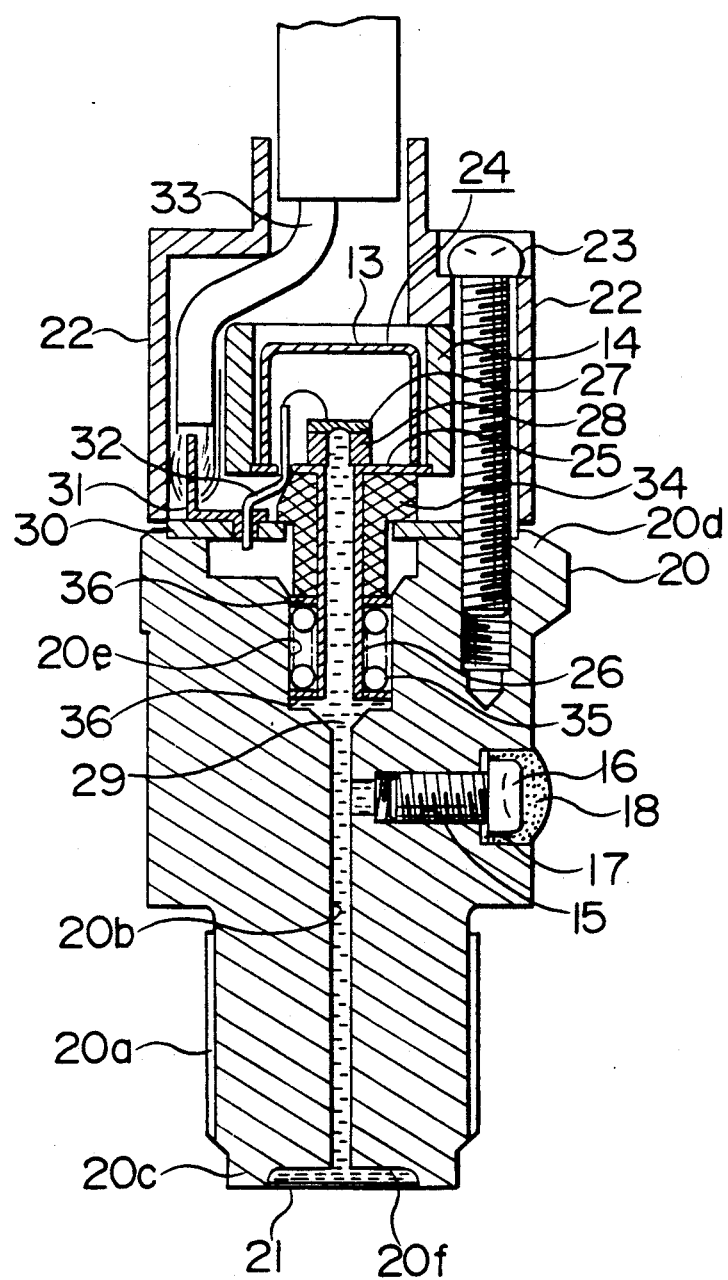
FIG. 1 is a longitudinal sectional view of the pressure sensor constructed in accordance with the present invention.
Figure 2:
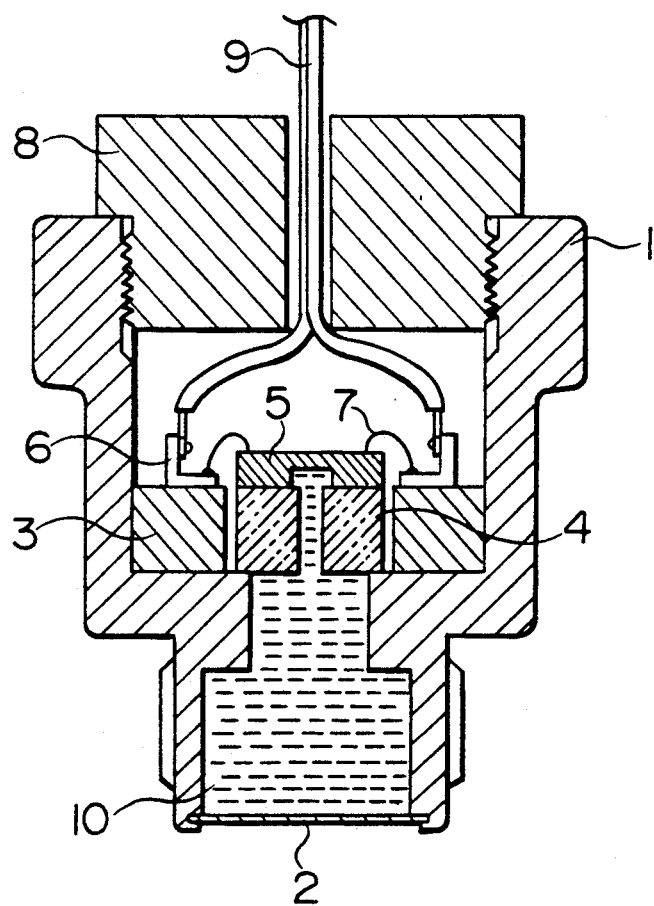
FIG. 2 is a longitudinal sectional view of a conventional pressure sensor.

FIG. 1 illustrates one embodiment of the pressure sensor of the present invention which comprises a hollow main body 20 having a thread 20a for attaching to an internal combustion engine (not shown) and having a central bore 20b extending therethrough. The main body 20 has a pressure detection end 20c and an output end 20d. The central bore 20b has a first large-diameter, socket portion 20e at its output end 20d and a second large-diameter, pressure-sensing portion 20f. A flexible diaphragm 21 is sealingly attached by welding for example to the detection end 20c of the main body 20 for receiving a pressure within the engine (not shown) to be detected. The socket portion 20e of the bore 20b contains therein a plurality of O-rings 35 and back-up plates 36, which are held in place by a tubular holder 34 extending through a support plate 30 attached to the main body 20.

The pressure sensor also comprises a pressure sensing assembly 24 for sensing a pressure to be detected and generating an electrical signal indicative of the pressure. The pressure sensing assembly 24 is disposed at the output end 20d of the main body 20 and supported on the holder 34 so that a closed detection cavity filled with a pressure transmitting medium such as silicone oil 29 is defined in the central bore 20b between the diaphragm 21 and the pressure sensing assembly 24.

More particularly, the pressure sensing assembly 24 comprises a disc-shaped base plate 25 placed on the holder 34 and a semiconductor pressure sensing element 27 sealingly attached to the base plate 25 through a ceramic mounting bed 28. In order to supply the output signal, electrical signal lines 32 are connected between the semiconductor pressure sensing element 27 and output terminals 31 mounted on the support plate 30 to extend through the base plate 25. The output terminal 31 is connected to outer cables 33 extending outside of the sensor for the external connection. The semiconductor pressure sensing element 27 is enclosed by a cover 13 attached to the base plate 25. The base plate 25 has sealingly attached thereto a cylindrical pressure transmitting pipe 26 for transmitting the pressure to be detected therethrough. The pressure transmitting pipe 26 extends through and is in contact with the tubular holder 34, the back-up plates 36 and the O-rings 35 so that a liquid-tight seal is established between the O-rings 35 and the pressure transmitting pipe 26. It is to be noted that this seal mechanism allows an easy attachment and detachment of the pressure sensing assembly 24 relative to the main body 20 by simply inserting and pulling the pressure transmitting pipe 26 in relation to the seal mechanism composed of the O-rings 35.

The pressure sensing assembly 24 is held in the illustrated position by a sleeve member 14 surrounding the cover 13 and engaging the circumferential edge of the cover 13 and the base plate 25. The upper end of the sleeve member 14 is engaged and held by a cap member 22 attached to the main body 20 through screws 23.

The pressure sensor of the present invention also comprises a threaded filling passage 15 formed in the cylindrical wall of the main body 20 and communicating with the detection cavity 20b for filling the pressure transmitting medium 29 in the detection cavity 20b therethrough. In order to close the passage 15, a closure plug which is a screw 16 with a seal washer 17 is inserted into and thread-engaged with the threaded passage 15. Preferably, a seal resin 18 is filled in the filling passage 15 to completely cover and seal the screw 16.

During manufacture of the pressure sensor, the pressure sensing assembly 24, which comprises the wired pressure sensing element 27 encased within the cover 13 and the base plate 25 and provided with the pressure transmitting pipe 26, can be assembled as one unit outside of the main body 20. This pressure sensing assembly 24 thus manufactured can be easily installed and attached to a testing device (not shown) by inserting the pressure transmitting pipe 26 into a pressure supplying connector (not shown) of the testing device. The pressure supplying connector may be of any suitable structure allowing an easy sealing attachment and detachment of the pressure transmitting pipe 26 of the pressure sensing assembly 24. One example of such pressure supplying connector may have substantially the same structure as that of the sealing mechanism disposed in the main body 20 of the pressure sensor illustrated in FIG. 1. Thus, with the pressure sensing assembly 24 connected at the pressure transmitting pipe 26 to the pressure supplying connector (not shown), pressurized silicone oil can be supplied into the pressure transmitting pipe 26 and the electrical output signal from the sensing element 27 is measured to determine the characteristics of the pressure sensing assembly 24. Also, since the pressure sensing assembly 24 is manufactured as a substantially independent unit, the output error which often occurs in the assembly 24 due to manufacturing error can be corrected in accordance with the test results.

When the test results including the results after the correction are satisfactory, the pressure sensing assembly 24 can be installed within the sensor main body 20 by inserting the pressure transmitting pipe 26 into the support and seal arrangement composed of the holder 34, the back-up plates 36 and the O-rings 35 mounted within the main body 20. Then, the signal lines 32 are connected to the output terminals 31 which is connected to the conductors 33, and the pressure sensing assembly 24 is held against the holder 34 by the sleeve member 14 which is held in place by the screw-secured cap member 22.

When the test results are not correctable or unsatisfactory even after the correction, that particular pressure sensing assembly 24 is determined to be unsuitable to be used in the pressure sensor.

Therefore, the test and calibration of the pressure sensing assembly can be carried out before the assembly of the sensor, so that the pressure sensing assembly that is non-conforming can be determined before the assembly, greatly saving time and materials used in assembly.

Also, since the pressure transmitting liquid can be filled within the detection cavity formed in the main body through the threaded filling passage 15 which can be sealed after filling by the plug screw 16, the packing 17 and the seal resin 18, the silicone oil filling operation can be easier as compared to that in the conventional design.

What is claimed is:

1. A pressure sensor for detecting gas pressure within a combustion chamber of an internal combustion engine, comprising:
   an elongate hollow main body (20) defining an elongate bore (20b) extending therethrough between a detection end (20c) and an output end (20d) adapted to be mounted in an engine combustion chamber;
   a flexible diaphragm (21) sealingly attached to said main body at said detection end for receiving a combustion chamber pressure to be detected;
   a pressure sensing assembly (24) having an elongate pressure transmitting tube (26) removably inserted in a linearly slideable manner within said elongate bore of said main body to define therewith a closed detection cavity between said diaphragm and said pressure sensing assembly;

a pressure transmitting medium (29) filled within said detection cavity; and resilient seal means disposed between said pressure sensing assembly and said main body for establishing a seal therebetween and for allowing an easy attachment and detachment of said pressure sensing assembly relative to said main body, and attendantly the ready linearly slideable insertion and withdrawal of the pressure transmitting tube into and from the elongate bore.

2. A pressure sensor as claimed in claim 1, wherein said seal means comprises an O-ring (35) disposed between said pressure sensing assembly and said main body.

3. A pressure sensor as claimed in claim 2, wherein said pressure sensing assembly comprises a pressure sensing element (27) for detecting pressure, and a base plate (25) for sealingly supporting said pressure sensing element within said main body, said pressure transmitting tube is attached to said base plate for transmitting the pressure to be detected, and said O-ring of said seal means is in contact with said pressure transmitting tube.

4. A pressure sensor as claimed in claim 1 further comprising filling means including a filling passage (15) disposed in said main body for filling said detection cavity with said pressure transmitting medium therethrough, and plug means (16) disposed in said filling passage for sealing said filling passage.

5. A pressure sensor as claimed in claim 4, wherein said filling means comprises a threaded filling passage formed in the main body and communicating with said detecting cavity, said plug means comprises a screw thread-engaged with said threaded passage, and seal resin (18) filled in said filling passage for sealing said filling passage.

* * * * *